(12) United States Patent
Horiguchi et al.

(10) Patent No.: US 7,411,950 B2
(45) Date of Patent: *Aug. 12, 2008

(54) COMMUNICATION METHOD AND COMMUNICATION APPARATUS

(75) Inventors: Mari Horiguchi, Kanagawa (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 659 days.

This patent is subject to a terminal disclaimer.

(21) Appl. No.: 11/092,468

(22) Filed: Mar. 28, 2005

(65) Prior Publication Data
US 2005/0207438 A1  Sep. 22, 2005

Related U.S. Application Data

(63) Continuation of application No. 09/764,565, filed on Jan. 17, 2001, now Pat. No. 7,050,449.

(30) Foreign Application Priority Data
Jan. 18, 2000  (JP)  ............... 2000-009391

(51) Int. Cl.
 *H04Q 11/00* (2006.01)
(52) U.S. Cl. ...................... 370/386; 370/421
(58) Field of Classification Search ............... 370/386, 370/421
See application file for complete search history.

(56) References Cited

U.S. PATENT DOCUMENTS

| 6,667,987 | B1 | 12/2003 | Kwon et al. |
| 6,687,264 | B1 | 2/2004 | Yoon et al. |
| 6,711,181 | B1 | 3/2004 | Xue et al. |
| 7,254,131 | B2 * | 8/2007 | Brewer .................. 370/362 |
| 2003/0210252 | A1 * | 11/2003 | Ludtke et al. ............. 345/629 |
| 2006/0013223 | A1 * | 1/2006 | Lym et al. ............... 370/389 |
| 2006/0062158 | A1 * | 3/2006 | Hattig .................. 370/255 |

FOREIGN PATENT DOCUMENTS

| DE | 39 32 863 | 6/1990 |
| EP | 0 421 779 | 4/1991 |
| EP | 0 971 509 | 1/2000 |

OTHER PUBLICATIONS

"IEEE Standard for a High Performance Serial Bus, Chapter 3: Summary Description" Jul. 22, 1996, Electrical and Electronics Engineers, Inc., New York, USA XP002240180 ISBN: 1-55937-583-3.

* cited by examiner

*Primary Examiner*—Brian N Nguyen
(74) *Attorney, Agent, or Firm*—Frommer Lawrence & Haug LLP; William S. Frommer

(57) ABSTRACT

The problem is to facilitate alteration of a transmission line in the case where the target device establishes a connection on the bus and thereby secures a transmission line in order to transmit stream data in a network of the IEEE 1394 scheme or the like. Stream data outputted from an output device 1 connected to a predetermined network is received by an input device 2. When the output device or a different device has sent an order for setting so that output data of the output device 1 may be inputted to a data input section 2b of the input device 2, the input device 2 conducts input setting based on the order. In addition, when the device which sent the order has sent an order to cancel the input setting, the input device 2 conducts processing of canceling the input setting.

5 Claims, 14 Drawing Sheets

FIG. 8A

| C_Type/Response | | |
|---|---|---|
| Command | 0000 | Control |
| | 0001 | Status |
| | 0010 | Specific Inquiry |
| | 0011 | Notify |
| | 0100 | General Inquiry |
| | 0101 | |
| | ~ | (Reserved for Future Specification) |
| | 0111 | |
| Response | 1000 | Not Implemented |
| | 1001 | Accepted |
| | 1010 | Rejected |
| | 1011 | In Transition |
| | 1100 | Implemented/Stable |
| | 1101 | Changed |
| | 1110 | (Reserved for Future Specification) |
| | 1111 | Interim |

FIG. 8B

| Subunit_Type | |
|---|---|
| 00000 | Video Monitor |
| ~ | (Reserved) |
| 00011 | Disc Recorder/Player |
| 00100 | Tape Recorder/Player |
| 00101 | Tuner |
| 00111 | Video Camera |
| ~ | (Reserved) |
| 11100 | Vendor Unique |
| 11101 | Reserved |
| 11110 | Subunit Type Extended to Next Byte |
| 11111 | Unit |

FIG. 8C

| Opcode:Operation Code | |
|---|---|
| 00h | Vendor-Dependent |
| 50h | Search Mode |
| 51h | Time Code |
| 52h | ATN |
| 60h | Open MIC |
| 61h | Read MIC |
| 62h | Write MIC |
| C1h | Load Medium |
| C2h | Record |
| C3h | Play |
| C4h | Wind |
| ~ | |

FIG. 9

|  | msb | | | | | | | lsb |
|---|---|---|---|---|---|---|---|---|
| Opcode | colspan="8" | Input Select (1B6) |
| Operand[0] | colspan="8" | Subfunction |
| Operand[1] | colspan="4" | Reserved | colspan="4" | F16 |
| Operand[2] | colspan="8" | Node_ID |
| Operand[3] | | | | | | | | |
| Operand[4] | colspan="8" | Output_Plug |
| Operand[5] | colspan="8" | Input_Plug |
| Operand[6] | colspan="4" | Signal_Destination_Subunit_Type | colspan="4" | Signal_Destination_Subunit_ID |
| Operand[7] | colspan="8" | Signal_Destination_Plug |
| Operand[8] | colspan="8" | Reserved |

FIG. 10

| Value | Subfunction | Meaning |
|---|---|---|
| $0_{16}$ | Connect | Establish Connection with Output Device |
| $1_{16}$ | Path Change | Conduct Path Change When Device Selection Is Conducted |
| $2_{16}$ | Select | Conduct Device Selection, But Do Not Establish Connection |
| $3_{16}$ | Disconnect | Disconnect Connection |

FIG. 11

| Value | Output_Plug |
|---|---|
| $00_{16}$-$1E_{16}$ | Serial Bus oPCR[0]-oPCR[30] |
| $1F_{16}$-$7F_{16}$ | Reserved |
| $80_{16}$-$9E_{16}$ | External Output Plug 0-30 |
| $9F_{16}$-$FF_{16}$ | Reserved |

FIG. 12

| Value | Signal_Destination_Plug |
|---|---|
| $00_{16}$-$1E_{16}$ | Serial Bus iPCR[0]-iPCR[30] |
| $1F_{16}$-$7E_{16}$ | Reserved |
| $7F_{16}$ | Any Available Serial Plug iPCR[x] |
| $80_{16}$-$9E_{16}$ | External Input Plug 0-30 |
| $9F_{16}$-$FE_{16}$ | Reserved |
| $FF_{16}$ | Any Available External Input Plug |

FIG. 13

| Value | Signal_Destination_Plug |
|---|---|
| $00_{16}$-$1E_{16}$ | Destination Plug 0-30 |
| $1F_{16}$-$FE_{16}$ | Reserved |
| $FF_{16}$ | Any Available Destination Plug |

FIG. 14

| | msb | | | | | | | lsb |
|---|---|---|---|---|---|---|---|---|
| Opcode | Input Select ($1B_{16}$) ||||||||
| Operand[0] | Subfunction ||||||||
| Operand[1] | Reserved |||| Result_Status ||||
| Operand[2] | Node_ID ||||||||
| Operand[3] | | | | | | | | |
| Operand[4] | Output_Plug ||||||||
| Operand[5] | Input_Plug ||||||||
| Operand[6] | Signal_Destination ||||||||
| Operand[7] | | | | | | | | |
| Operand[8] | Reserved ||||||||

FIG. 15

| Value | Result_Status | Return |
|---|---|---|
| $0_{16}$ | No Error | Accepted |
| $1_{16}$ | Ready | Accepted |
| $2_{16}$ | Disabled | Rejected |
| $3_{16}$ | Locked | Rejected |
| $4_{16}$ | P-to-P(Not Owner) | Rejected |
| $5_{16}$ | Insufficient Resource | Rejected |
| $6_{16}$ | Source Not Found | Rejected |
| $7_{16}$ | Not Selected | Rejected |
| $8_{16}$ | Not Registered | Rejected |
| $9_{16}$~$C_{16}$ | Reserved | |
| $D_{16}$ | Any Other Reason | Rejected |
| $E_{16}$ | No Information | Interim |
| $F_{16}$ | Busy | Interim |

FIG. 16

| Value | Input_Plug |
|---|---|
| $00_{16}$-$1E_{16}$ | Serial Bus Plug Zero-30 |
| $1F_{16}$-$7F_{16}$ | Reserved for Future Specification |
| $80_{16}$-$9E_{16}$ | External Plug Zero-30 |
| $9F_{16}$-$FE_{16}$ | Reserved for Future Specification |
| $FF_{16}$ | (Not Applicable for Accepted Response) |

COMMUNICATION METHOD AND COMMUNICATION APPARATUS

This application is a continuation of Ser. No. 09/764,565, now U.S. Pat. No. 7,050,499 filed Jan. 17, 2001.

BACKGROUND OF THE INVENTION

1. Field of the Invention

The present invention relates to a communication method and a communication apparatus which are applied to the case where data communication is conducted between devices connected by a bus line of, for example, the IEEE 1394 scheme.

2. Description of the Related Art

AV devices capable of mutually transmitting information via a network using a serial data bus of the IEEE 1394 scheme have been developed. When conducting data transmission via this bus, there are prepared an isochronous transfer mode to be used when video data and audio data of a comparatively large capacity are subject to real time transmission, and an asynchronous transfer mode to be used when still images, text data, control commands and so on are transmitted certainly. A dedicated band is used for transmission every mode.

FIG. 18 is a diagram showing an example of connection using a bus of the IEEE 1394 scheme. It is now assumed that a source device "a" which is a device for sending out data, a target device "b" which is a device for receiving data sent out from the source device "a", and a controller "c" for controlling data transmission between the devices "a" and "b" are connected to a bus "d" of the IEEE 1394 scheme. Assuming at this time that video data is transmitted between the devices "a" and "b" under the control of the controller c, the controller c secures an isochronous transfer channel on the bus "d", establishes connection between the devices "a" and "b", and starts transmission from the source "a" to the target device "b".

In the case where data transmission is thus conducted between the source device "a" and the target device "b", a transmission scheme of control commands called AV/C command transaction set which can be applied to, for example, AV devices can be applied. Details of the AV/C command transaction set are opened to the public.

Considering data transmission of video data and audio data from the source device to the target device, selection of data which can be inputted to an input device can be conducted freely, if input selection can be conducted on the target device side. Therefore, the present inventors proposed earlier processing of establishing a connection between the target device and the source device and securing a transmission line on the bus (Japanese Patent Application 11-328764).

SUMMARY OF THE INVENTION

Basically, in the IEEE 1394 scheme, only a device which established a connection can cancel the connection. If the target device establishes a connection, other devices such as the source device and the controller on the bus cannot execute processing of canceling the connection. Even in the case where it is desired to start data transmission between other devices on the bus, the controller must wait until the connection established by the target device is canceled if there is no free line in the transmission lines. There occurs such a problem that it becomes impossible for the controller to conduct transmission control on the bus accurately.

An object of the present invention is to facilitate alteration of a transmission line in the case where the target device establishes a connection on the bus and thereby secures a transmission line in order to transmit stream data in a network of the IEEE 1394 scheme or the like.

BRIEF DESCRIPTION OF THE DRAWINGS

FIG. 8 is a diagram showing example of commands and responses of an AV/C command transaction set;

FIG. 9 is a diagram showing an example of an input select control command according to an embodiment of the present invention;

FIG. 10 is a diagram showing examples of a subfunction according to an embodiment of the present invention;

FIG. 11 is a diagram showing an example of an output plug according to an embodiment of the present invention;

FIG. 12 is a diagram showing an example of a signal destination plug according to an embodiment of the present invention;

FIG. 13 is a diagram showing a different example of a signal destination plug according to an embodiment of the present invention;

FIG. 14 is a diagram showing an example of an input select control response according to an embodiment of the present invention;

FIG. 15 is a diagram showing examples of status data according to an embodiment of the present invention;

FIG. 16 is a diagram showing an example of an input plug according to an embodiment of the present invention;

DESCRIPTION OF THE PREFERRED EMBODIMENTS

In accordance with the present invention, stream data outputted from an output device connected to a predetermined network is received by an input device. When the output device or a different device has sent an order for setting so that output data of the output device may be inputted to a data input section of the input device, the input device conducts input setting based on the order. In addition, when the device which sent the order has sent an order to cancel the input setting, the input device conducts processing of canceling the input setting.

According to the present invention, it becomes possible to cancel the input setting when a cancel order is received from the device which sent an order to execute input setting, after an input device executed the input setting.

Hereafter, an embodiment of the present invention will be described by referring to FIGS. 1 to 17.

Figure 1:
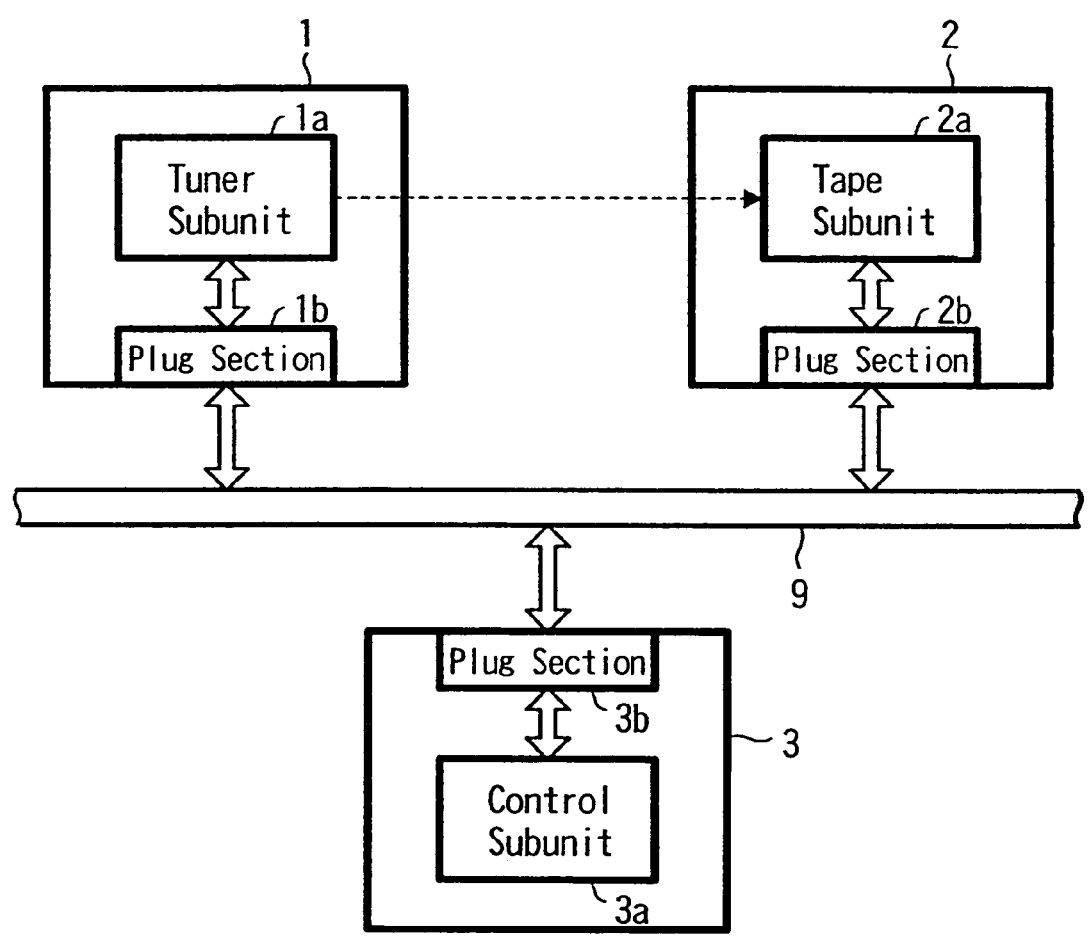
FIG. 1 is a block diagram showing an example of a system configuration according to an embodiment of the present invention.

A configuration example of a network system to which the present invention has been applied will now be described by referring to FIG. 1. It is assumed that a plurality of devices are connected to this network system via a serial data bus 9 of the IEEE 1394 scheme. Here, as shown in FIG. 1, an IRD (Integrated receiver decoder: digital satellite broadcast receiving device) 1, a video deck 2, and a television set 3 are connected to the bus 9. Each of the devices is a device having terminals for connection to a bus of the IEEE 1394 scheme, and has a function mounted thereon to effect control by using the AV/C command transaction set. Here, the television set 3 has a function of a controller (control device) serving as a device for effecting transmission control on the bus 9. Furthermore, another device such as the IRD 1 connected to the bus 9 may have the function serving as the controller. Furthermore, a device other than AV devices, such as a personal computer device, is connected to the bus 9 in some cases.

When viewed from the viewpoint of the functions prescribed in the AV/C command transaction set, the devices 1, 2 and 3 may have a configuration having a subunit for executing processing of implementing each function and a plug section for conducting data inputting and outputting between the bus 9 and the internal subunit. For example, the IRD 1 has a tuner subunit 1a for receiving the broadcast, the video deck 2 has a tape subunit 2a for recording information onto a recording medium (e.g., a video tape) and reproducing information from a medium, and the television set 3 has a control section 3a for executing a control function. Furthermore, the devices 1, 2 and 3 have the plug sections 1b, 2b, and 3b, respectively. In each of the plug sections 1b, 2b, and 3b, a plurality of plugs are mounted and can be connected to a plurality of channels on the bus 9. Relations between the plugs and the channels will be described later. In a transmission example described later, the IRD 1 is handled as a source device serving as a data output device, the video deck 2 is handled as a target device serving as a data input device, and the television set 3 is handled as a controller serving as a control device.

Figure 2:
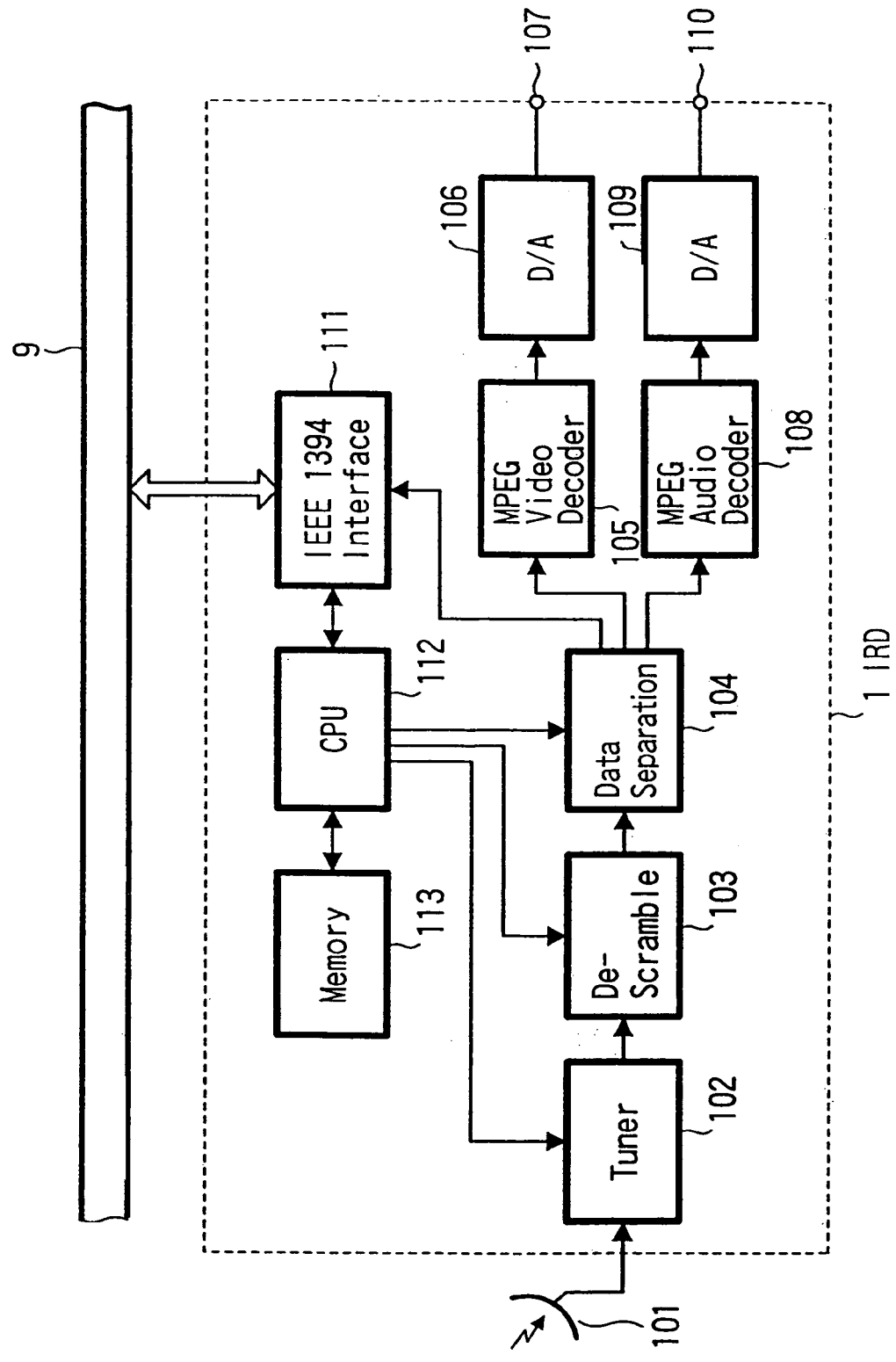
FIG. 2 is a block diagram showing an example of an internal configuration of an IRD according to an embodiment of the present invention.

FIG. 2 shows an example of an internal configuration of the IRD 1. The IRD 1 is a digital satellite broadcast receiver. Signals received by a connected antenna 101 are subject to reception processing in a tuner 102. A broadcast wave of a predetermined channel is thus received. The signal received by the tuner 102 is subject in a de-scramble circuit 103 to processing of canceling scramble applied to broadcast data. The data with the scramble canceled are supplied to a data separation section 104. Desired data is extracted from data multiplexed into one channel.

Video data separated by the data separation section 104 is supplied to an MPEG video decoder 105, and subject therein to decode processing of the MPEG scheme. Then a resultant signal is supplied to a digital to analog converter 106 to produce an analog video signal. The analog video signal is supplied to an output terminal 107. Audio data separated by the data separation section 104 is supplied to an MPEG audio decoder 108, and subject therein to decode processing of the MPEG scheme. Then a resultant signal is supplied to a digital to analog converter 109 to produce an analog audio signal. The analog audio signal is supplied to an output terminal 110.

Furthermore, the IRD 1 of the present example has an IEEE 1394 interface section 111 so as to be able to send out the received video data and audio data of the MPEG scheme onto the connected bus 9. Furthermore, when the IRD 1 has received various data broadcast channels or audio data channels, the IRD 1 can also send out the received data onto the bus 9 via the IEEE 1394 interface section 111.

The reception operation and operation of sending data onto the bus 9 are executed under the control of a central control unit (CPU) 112. Furthermore, data sending from the IEEE 1394 interface section 111 to the bus 9 and data receiving from the bus 9 in the interface section 111 are also executed under the control of the CPU 112. A memory 113 for storing data required for the control is connected to the CPU 112.

Figure 3:
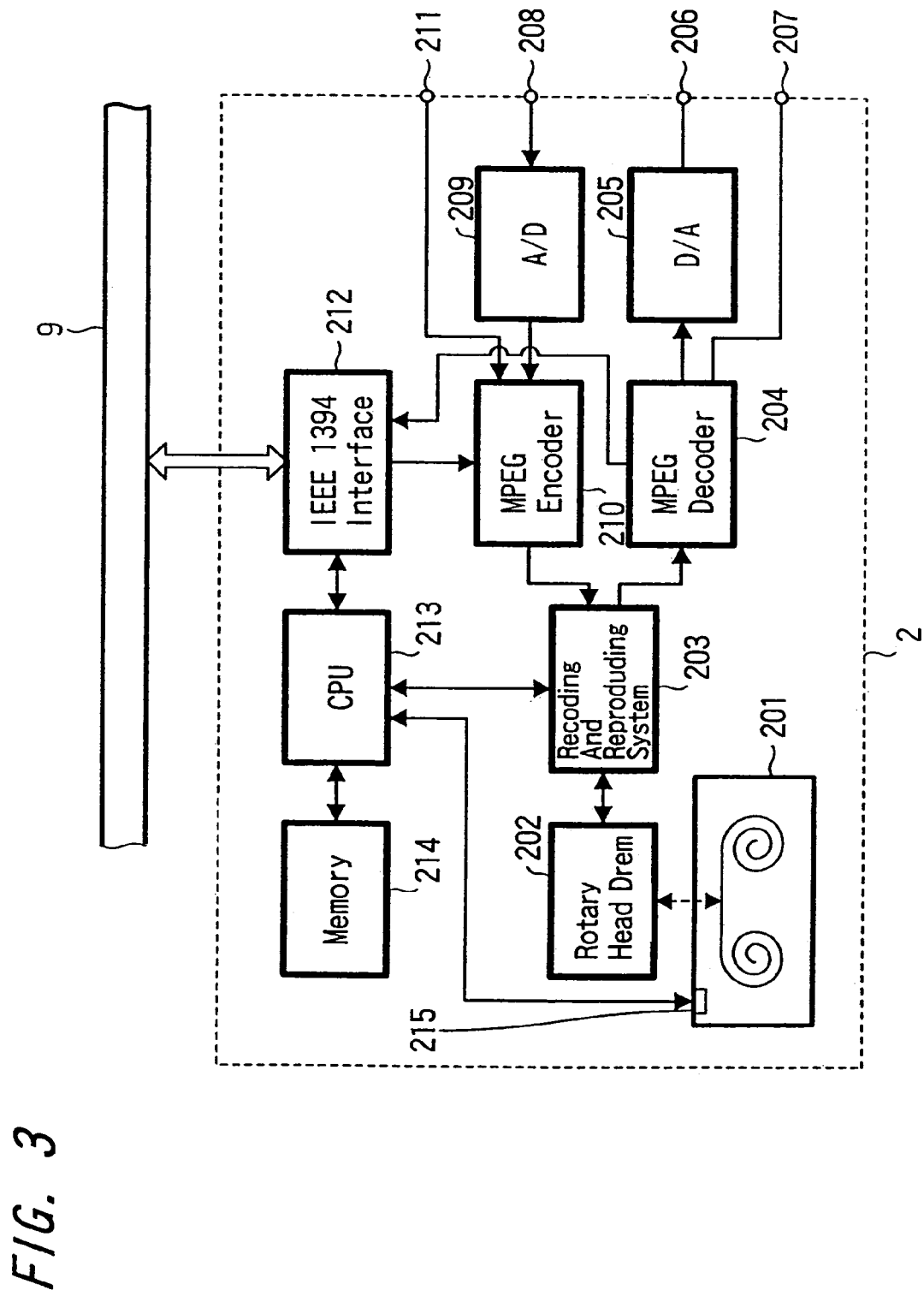
FIG. 3 is a block diagram showing an example of an internal configuration of a video deck according to an embodiment of the present invention.

FIG. 3 shows an example of an internal configuration of the video deck 2. The video deck 2 is a video recording and reproducing device of a digital scheme for recording video data (and audio data accompanying the video data) on a medium such as magnetic tape as digital data coded by the MPEG scheme and reproducing the video data.

As shown in FIG. 3, the video deck 2 has such a configuration that magnetic tape mounted on a cassette 201 which is a casing made of resin is subjected to recording and reproducing using a magnetic head attached to a rotary head drum section 202. A signal reproduced by the magnetic head of the rotary head drum section 202 is supplied to a recording and reproducing system circuit 203 and processed. Reproduced data of the MPEG scheme is thus obtained and decoded by an MPEG decoder 204 to restore original digital data. The restored digital video data is converted to an analog video signal by a digital to analog converter 205. Then, the analog video signal is outputted via an analog output terminal 206 and supplied to a monitor and the like connected to the terminal 206. Furthermore, digital video data decoded by the MPEG decoder 204 is outputted from a digital output terminal 207. In addition, reproduced data supplied to the MPEG decoder 204 can be supplied to an IEEE 1394 interface section 212 and sent out to the connected bus 9 as video data coded by the MPEG scheme and left intact.

As for the configuration of a recording system, an analog video signal obtained at an analog input terminal 208 is converted to digital video data by an analog to digital converter 209. Then the converted video data is supplied to an MPEG encoder 210. The MPEG encoder 210 produces video data coded according to the MPEG scheme. The video data coded according to the MPEG scheme by the MPEG encoder 210 is supplied to the recording and reproducing system circuit 203 and processed. A recording signal to be supplied to the rotary head drum section 202 is thus obtained. This recording signal is recorded on magnetic tape mounted on the cassette 201. Furthermore, as for video data of the MPEG scheme supplied from the bus 9 to the IEEE 1394 interface section 212 as well, the video data is supplied to the recording and reproducing system circuit 203 via the MPEG encoder 210 and recorded onto magnetic tape mounted on the cassette 201.

The reproduction operation and recording operation in these circuits are executed under the control of a central control unit (CPU) 213. Furthermore, data sending from the IEEE 1394 interface section 212 to the bus 9 and data receiving from the bus 9 in the interface section 212 are also executed under the control of the CPU 213. A memory 214 for storing data required for the control is connected to the CPU 213. As for the cassette 201 mounted on the video deck 1 of the present example, it is a cassette having a non-volatile memory 215 attached thereto in some cases. When the cassette having the non-volatile memory 215 attached thereto is mounted, the CPU 213 manages reading and writing of data stored in the memory 215. Index information (such as the recording date, channel, and program) and the like of data recorded on the magnetic tape is stored in the memory 215.

Figure 4:
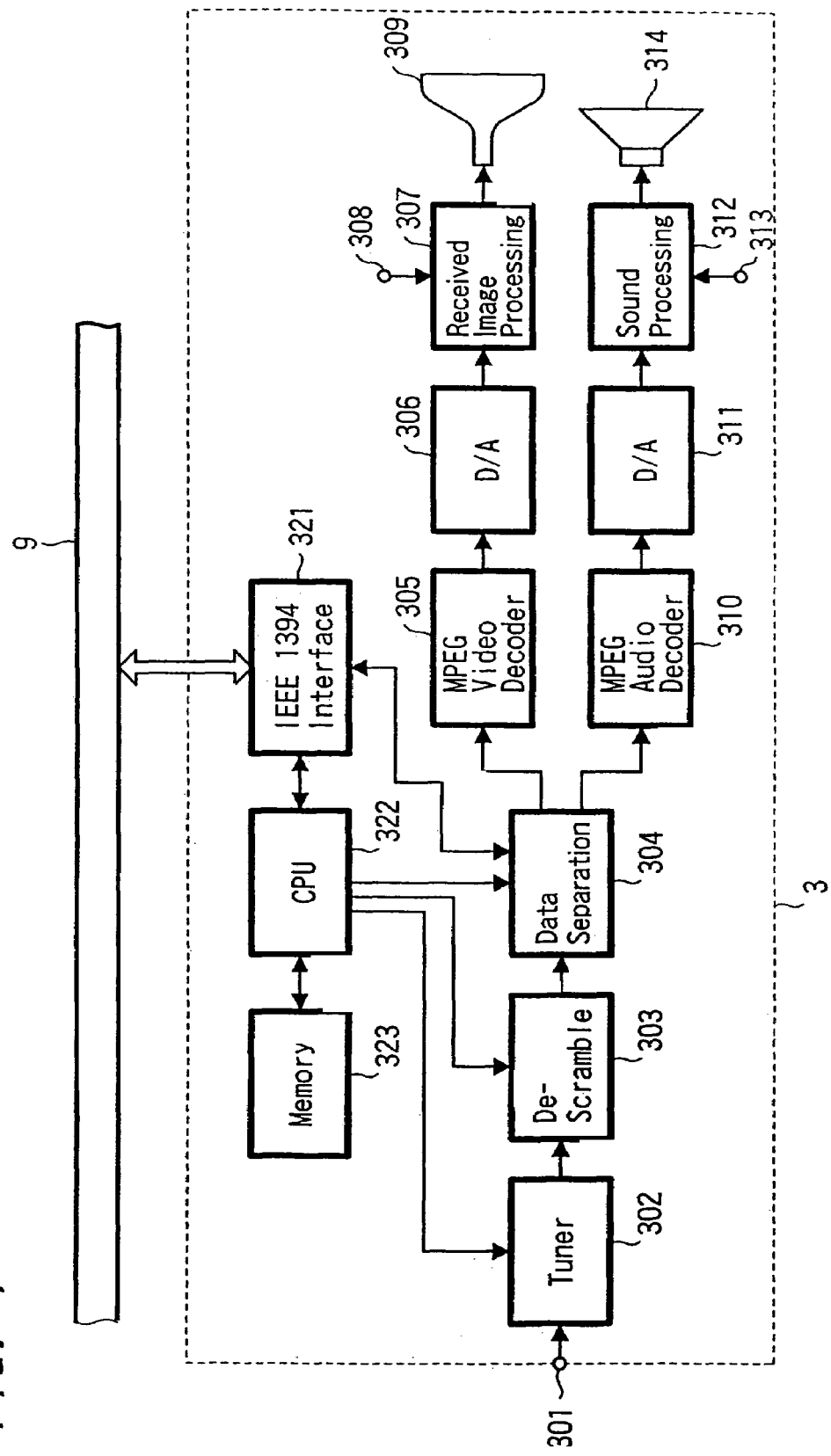
FIG. 4 is a block diagram showing an example of an internal configuration of a television set according to an embodiment of the present invention.

The configuration of the television set 3 will now be described by referring to FIG. 4. FIG. 4 shows an example of the internal configuration of the television set 3. Here, the television set 3 is formed as the so-called digital television set for receiving the digital television broadcast. An input terminal 301 having an antenna or the like connected thereto is connected to a tuner 302. Reception processing is conducted in the tuner 302 to receive a broadcast wave of a predetermined channel. The signal received by the tuner 302 is subject, in a de-scramble circuit 303 as occasion demands, to processing of canceling scramble applied to broadcast data. The data with the scramble canceled are supplied to a data separation section 304. Desired data is extracted from data multiplexed into one channel.

Video data separated by the data separation section 304 is supplied to an MPEG video decoder 305, and subject therein to decode processing of the MPEG scheme. Then a resultant signal is supplied to a digital to analog converter 306 to produce an analog video signal. The analog video signal is supplied to a received image processing circuit 307. Processing for driving display means 309 such as a cathode ray tube and displaying an image is thus conducted. It is also made possible to supply video data obtained at an external input terminal 308 to the received image processing circuit 307 and conduct display processing therein.

Audio data separated by the data separation section 304 is supplied to an MPEG audio decoder 310, and subject therein to decode processing of the MPEG scheme. Then a resultant signal is supplied to a digital to analog converter 311 to produce an analog audio signal. The analog audio signal is supplied to a sound processing circuit 312. Processing for driving a speaker 314 is conducted therein, and the sound is outputted from the speaker 314. It is also made possible to supply audio data obtained at an external input terminal 313 to the sound processing circuit 312 and conduct display processing therein.

Furthermore, the IRD 1 of the present example has an IEEE 1394 interface section 321 so as to be able to send out the video data, audio data, and the like of the MPEG scheme or the like received by the tuner 302 onto the connected bus 9. Furthermore, video data and audio data transmitted via the bus 9 can be supplied to the decoders 305 and 310 via the data separation section 304, and video image receiving and audio output processing can be conducted.

These operations as the television set and the transmission operation via the bus 9 are executed under the control of a central control unit (CPU) 322. Data sending from the IEEE 1394 interface section 321 to the bus 9 and data receiving from the bus 9 in the interface section 321 are also executed under the control of the CPU 322. The function as a controller for managing the transmission on the bus 9 is also executed by the CPU 322. Therefore, the CPU 322 and its peripheral circuit correspond to the control section 3a in the television set 3 shown in FIG. 1. A memory 323 for storing data required for the control is connected to the CPU 322. Furthermore, although not illustrated, there are provided manipulation keys for ordering various manipulations concerning the television set and manipulations concerning operations of other devices connected by the bus 9 (such as the input switchover action, recording operation, reproduction operation, and so on), and a receiving section for receiving similar manipulation orders from remote control devices. Control based upon the manipulation order is executed by the CPU 322.

Figure 5:
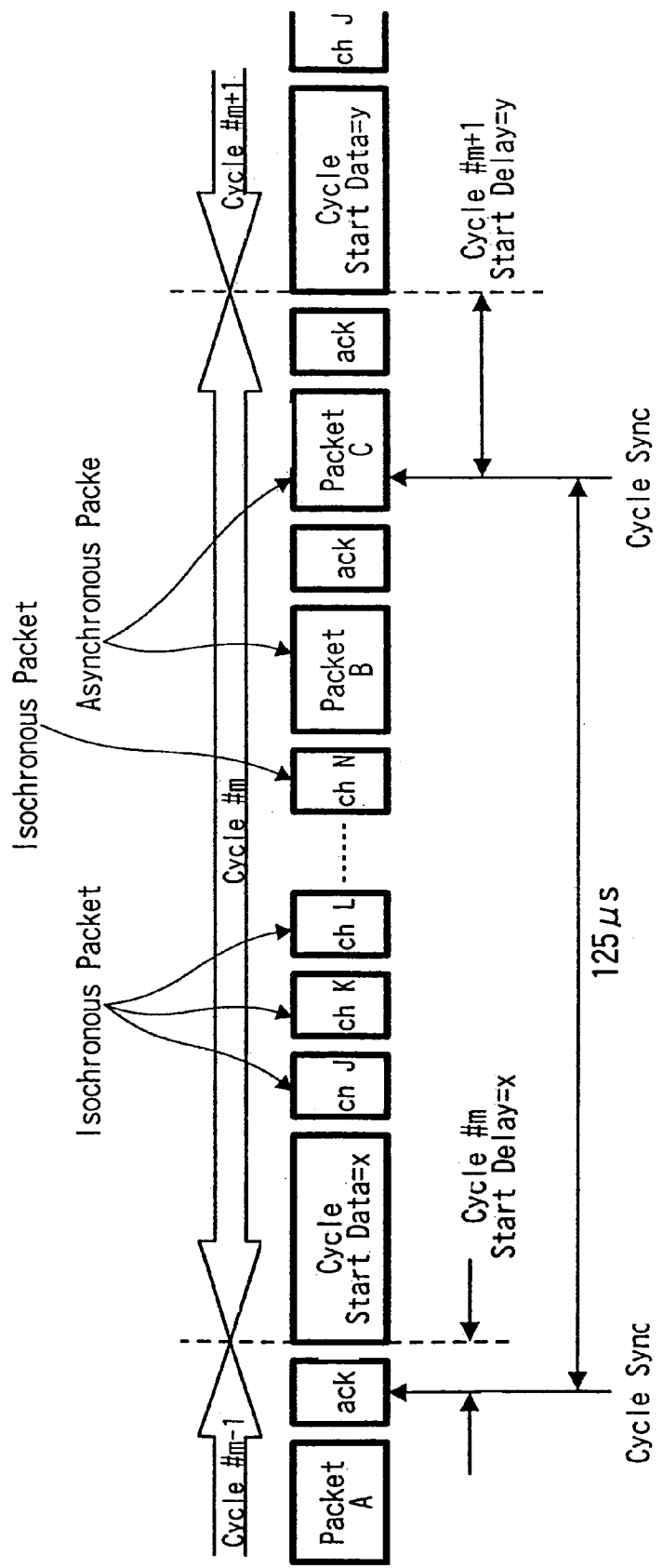
FIG. 5 is a diagram showing an example of a cycle structure of data transmission on a bus of the IEEE 1394 scheme.

A data transmission state on the bus 9 of the IEEE 1394 scheme connecting the above described devices to each other will now be described. FIG. 5 is a diagram showing a cycle structure of data transmission of devices connected by the IEEE 1394. According to the IEEE 1394, data is divided into packets and the packets are transmitted in a time division manner by taking a cycle having a length of 125 μs as a reference. This cycle is produced by a cycle start signal supplied from a node having a cycle master function (some device connected to the bus). Isochronous packets secure a band (which is called band although it is a time unit) required for transmission from the head of every cycle. In isochronous transmission, therefore, transmission of data in a fixed time is ensured. If a transmission error occurs, there is no mechanism for protection and data is lost. During time of each cycle which is not used for isochronous transmission, a node which has secured the bus as a result of arbitration sends out asynchronous packets. In this asynchronous transmission, reliable transmission is ensured by using acknowledgment and retry. However, the transmission timing does not become fixed.

In order that a predetermined node (device) may conduct isochronous transmission, the node must correspond to the isochronous function. In addition, at least one of nodes corresponding to the isochronous function must have a cycle master function. In addition, at least one of nodes connected to the IEEE 1394 serial bus must have an isochronous resource manager function. The device having the isochronous resource manager function corresponds to the above described controller (the television set in the case of the present example).

Figure 6:
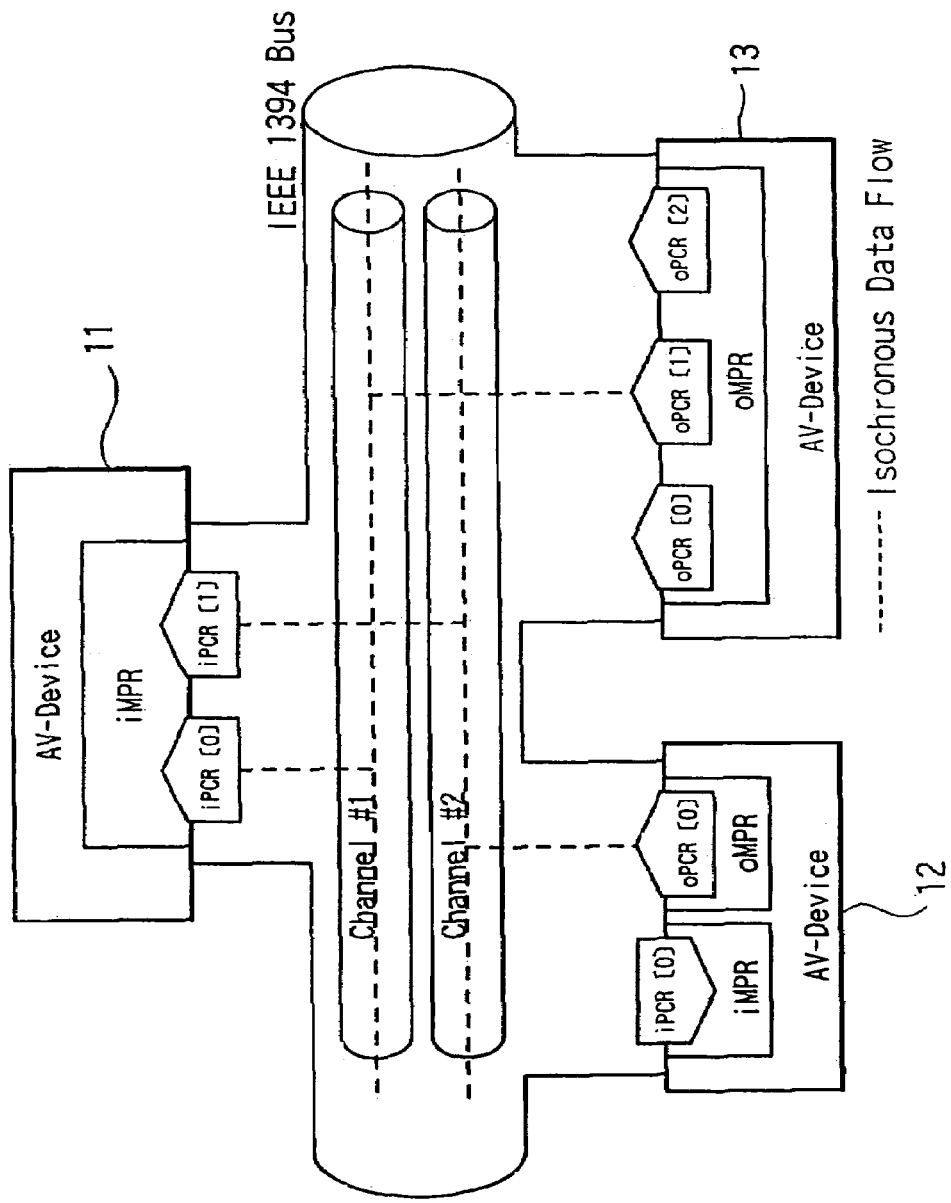
FIG. 6 is a diagram showing an example of connection using a bus of the IEEE 1394 scheme.

FIG. 6 is a diagram showing relations among plugs, plug control registers, and isochronous channels required to conduct data transmission on a bus. AV Devices 11 to 13 are connected by an IEEE 1394 serial bus. Isochronous data specified in channel by an oPCR [1] among oPCR [0] to oPCR [2] prescribed in transmission rate and the number of oPCRs by an oMPR of the AV device 13 is sent out to a channel #1 of the IEEE 1394 serial bus. Between iPCR [0] and iPCR [1] prescribed in transmission rate and the number of iPCRs by an iMPR of the AV device 11, the iPCR [0] specifies the input channel #1. The AV device 11 reads isochronous data sent out on the channel #1 of the IEEE 1394 serial bus. In the same way, the AV device 12 sends out isochronous data onto the channel #2 specified by the oPCR [0]. The AV device 11 reads isochronous data from the channel #2 specified by the iPCR [1].

It is set so that data sent out from an output plug of a device of the data transmission source onto the bus may be received by an input plug of a device of data receiving destination by using the channel thus secured. Processing of thus setting a channel and a plug and establishing a connection is executed under the control of a predetermined device (controller) connected to the bus.

In this way, data transmission is conducted between devices connected by the IEEE 1394 serial bus. In the system of the present example, however, control and state decision of respective devices can be conducted by utilizing an AV/C command prescribed as commands for controlling devices connected via the IEEE 1394 serial bus. Data used in this AV/C command will hereafter be described.

Figure 7:
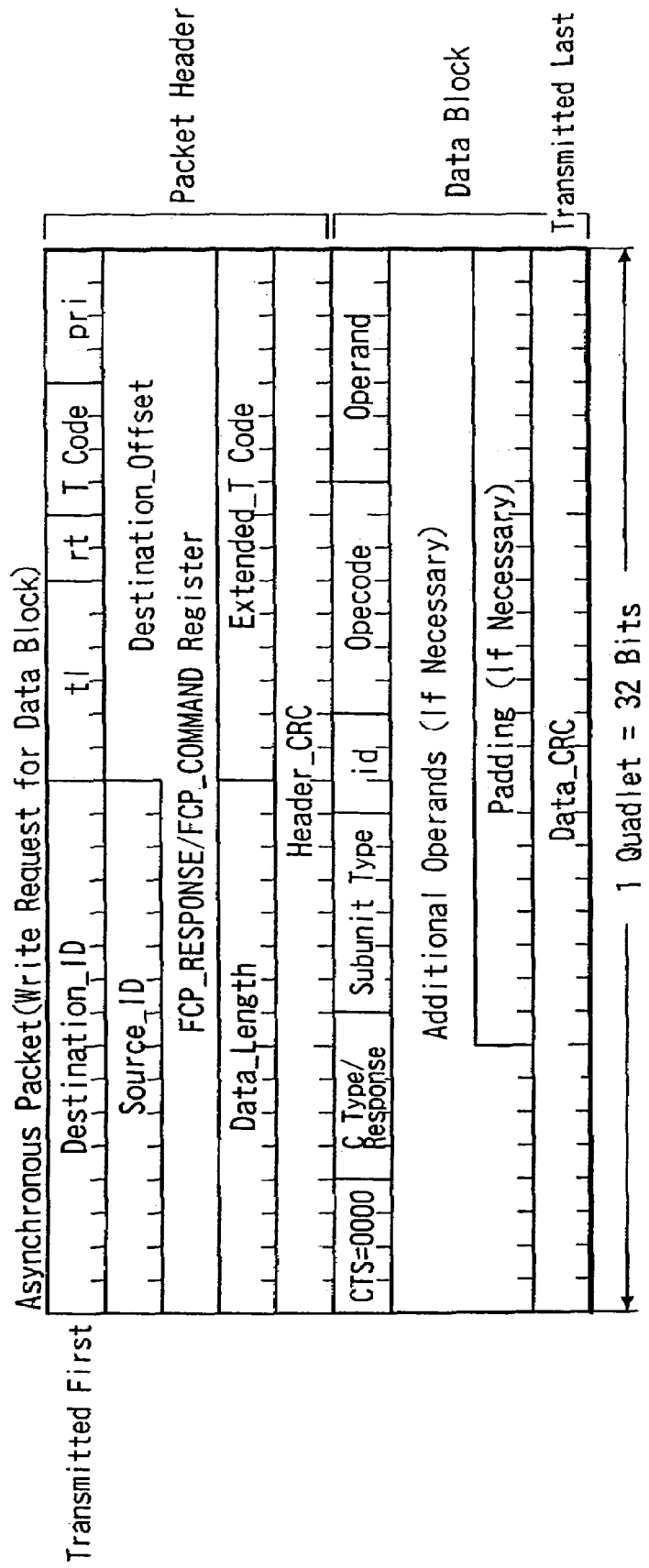
FIG. 7 is a diagram showing an example of a configuration of data transmitted by using an AV/C command transaction set.

FIG. 7 shows a data structure of a packet transmitted in an asynchronous transfer mode of the AV/C command. The AV/C command is a command set for controlling an AV device, and its CTS (ID of command set)="0000". AV/C command frames and response frames are exchanged between the nodes. In order to prevent casting a burden upon the bus and the AV device, a response to a command is defined to be sent within 100 ms. As shown in FIG. 7, data of an asynchronous packet has 32 bits (=1 quadlet) in the horizontal direction. Upper columns of FIG. 7 show a header portion of the packet, and lower columns of FIG. 7 show a data block. A destination ID indicates the destination.

The CTS indicates an ID of the command set. In the AV/C command set, CTS="0000". A c type/response field indicates a function class of a command when the packet is a command, and a processing result of a command when the packet is a response.

Commands are broadly divided into four kinds: (1) commands (CONTROL) for controlling the function from the outside; (2) commands (STATUS) for inquiring about the state from the outside; (3) commands for inquiring whether support of a control command is present, from the outside (GENERAL INQUIRY (whether support of an opcode is present) and SPECIFIC INQUIRY (whether support of an opcode and operands are present)); and (4) commands (NOTIFY) for requesting the notice of a state change to the outside.

A response is returned according to the command kind. As responses to the CONTROL commands, there are "NOT IMPLEMENTED", "ACCEPTED", "REJECTED" and "INTERIM" (interim response). As responses to the STATUS commands, there are "NOT IMPLEMENTED", "REJECTED", "IN TRANSACTION", and "STABLE". As responses to "GENERAL INQUIRY" and "SPECIFIC INQUIRY" commands, there are "IMPLEMENTED" and "NOT IMPLEMENTED". As responses to the "NOTIFY" command, there are "NOT IMPLEMENTED", "REJECTED", "INTERIM", and "CHANGED". Commands and responses other than those described here are defined in some cases.

A "subunit type" is provided to specify a function in the device. For example, "tape recorder/player", "tuner", or the like is assigned. In order to distinguish in the case where there are a plurality of subunits of the same kind, addressing is conducted by using a subunit id as a distinguishing number. An "opcode" represents a command. An "operand" represents a parameter of the command. "Additional operands" is a field added as occasion demands. "Padding" is a also field added as occasion demands. A "data CRC" (Cyclic Redundancy Check) is used for error check at the time of data transmission.

FIG. 8 shows a concrete example of the AV/C command. FIG. 8(A) shows concrete examples of c type/response. Its upper column shows commands and its lower column shows responses. "CONTROL" is assigned to "0000". "STATUS" is assigned to "0001". "SPECIFIC INQUIRY" is assigned to "0010". "NOTIFY" is assigned to "0011". "GENERAL INQUIRY" is assigned to "0100". "0101 to 0111" are reserved and secured for future specifications. "NOT IMPLEMENTED" is assigned to "1000". "ACCEPTED" is assigned to "1001". "REJECTED" is assigned to "1010". "IN TRANSITION" is assigned to "1011". "IMPLEMENTED/ STABLE" is assigned to "1100". "CHANGED" is assigned to "1101". "INTERIM" is assigned to "1111". "1110" is reserved and secured for future specifications.

FIG. 8(B) shows concrete examples of the subunit type. "Video Monitor" is assigned to "00000". "Disk recorder/ Player" is assigned to "00011". "Tape recorder/Player" is assigned to "00100". "Tuner" is assigned to "00101". "Video Camera" is assigned to "00111". "Vender unique" is assigned to "11100". "Subunit type extended to next byte" is assigned to "11110". "Unit" is assigned to "11111", and it is used when the command or response is sent to the device itself. For example, turning on and off of the power supply can be mentioned.

FIG. 8(C) shows concrete examples of opcodes. For each of the subunit types, a table of opcodes exists. In FIG. 8(C), opcodes in the case where the subunit type is the "tape recorder/player" are shown. Furthermore, for each opcode, an operand is defined. Here, "VENDOR-DEPENDENT" is assigned to "00h". "SEARCH MODE" is assigned to "50h". "TIMECODE" is assigned to "51h". "ATN" is assigned to "52h". "OPEN MIC" is assigned to "60h". "READ MIC" is assigned to "61h". "WRITE MIC" is assigned to "62h". "LOAD MEDIUM" is assigned to "C1h". "RECORD" is assigned to "C2h". "PLAY" is assigned to "C3h". "WIND" is assigned to "C4h".

By utilizing the AV/C command transaction set thus prescribed, control of the devices connected to the bus is conducted and data transmission between devices connected by the bus is conducted on the basis of the control. In the present example, there are prepared a command for controlling the input selection state and a canceling command for canceling the input selection executed by the control, with respect to input devices (target devices) to which stream data can be inputted. A packet of the command is sent out by either an output device for outputting pertinent stream data, or a control device for controlling the transmission between the output device and the input device. However, the canceling command can be outputted by only a device which issued a command for executing the input selection to be canceled by the pertinent command.

FIG. 9 shows a data configuration example of [opcode] and [operand] of an input select control command which is this command. This data is disposed in a packet shown in FIG. 7. Its command type becomes [CONTROL] because the command is data for giving a control order. In the area of the [opcode], data of [INPUT SELECT] which is the pertinent command is disposed. In the area of the [operand (0)], data of a subfunction showing details of the control state is disposed. In the area of the [operand (1)], a section of bits 1 to 4 (a portion denoted by "reserved") is undefined and specific data (here, a value F which is "1111") is disposed in a section of bits 5 to 8 in order to indicate that the area is an area which is not used in the command.

In the area of [operand (2) and operand (3)], a node ID of an output device is disposed. In the area of [operand (4)], an output plug ID of the output device is disposed. By the node ID and the output plug ID of the output device, an output device (source device) desired to output the stream data and an output plug of the device are specified.

In the area of [operand (5)], an input plug ID of an input device is disposed. In the area of [operand (6) and operand (7)], data concerning a subunit which is an internal function block of the input device is disposed. To be concrete, in the area of [operand (6)], data concerning the type of a destination subunit which is a subunit of the input device side and data of the subunit ID are disposed. In the area of [operand (7)], data of an input plug of the destination subunit is disposed. When the area of the [operand (6)] has a specific value (such as data FF), however, there results an order which does not specify the subunit of the input device. The area of [operand (8)] is undefined here.

In the case where the input plug ID of the input device is not known at such a stage that a device sending this command (i.e., the output device or the control device) sends the command, data of, for example, a maximum value is disposed. In the output plug ID of the output device, ID data of a plug for outputting stream data from the output device is disposed.

FIG. 10 shows an example of subfunction data showing details of the control state disposed in the area of the [operand (0)]. Here, the following four subfunctions are defined.

When the value is "0", the subfunction is a subfunction of [Connect] and the command is a command for ordering establishment of connection with respect to the output device.

When the value is "1", the subfunction is a subfunction of [Path change] and the command is a command for conducting a path change in the case where device selection has been conducted. This path change is, for example, a change from a path (transmission line) using the bus 9 to an analog transmission line, or an opposite change.

When the value is "2", the subfunction is a subfunction of [select] and the command is a command for conducting the selection of the output device, but causing a wait in such a state that the processing of establishing a connection to the device is not conducted.

When the value is "3", the subfunction is a subfunction of [disconnect] and the command is a command for disconnecting the connection established with respect to the output device. This command corresponds to a command for causing canceling to be executed.

FIG. 11 is a diagram showing a data configuration example of an output plug ID. For example, 31 output plugs for serial bus of [0] to [30] and 31 external output plugs of [0] to [30] are provided with individual IDs. The external output plugs are plugs which do not use the bus 9. A portion denoted as "Reserved" is a data value which is undefined in plug ID.

FIG. 12 shows a data example of an input plug ID of the destination subunit in the area of the [operand (7)]. The example of FIG. 12 is an example of the case where the area of [operand (6)] becomes data FF and the destination subunit is not specified. In this example, 31 input plugs for serial bus of [0] to [30] and 31 external input plugs of [0] to [30] are provided with individual IDs. Furthermore, in the case of data 7F, it orders to use one of input plugs of such a kind as to be used for the serial bus, and it does not specify an input plug among them. Furthermore, in the case of data FF, it orders to use one of input plugs of such a kind as to be used for external input, and it does not specify an external input plug among them. A portion denoted as "Reserved" is a data value which is undefined in plug ID.

FIG. 13 shows a data example of an input plug ID of the destination subunit in the area of the [operand (7)] in the case where the area of [operand (6)] is other than the data FF (i.e., in the case where a destination subunit is specified). In this case, IDs individually provided to 31 subunits of [0] to [30] are used. Furthermore, in the case of data FF, it orders not to specify an input plug of the subunit. A portion denoted as "Reserved" is an undefined data value.

When the packet of the command heretofore described and shown in FIG. 9 is transmitted to an input device, a response to the control command is returned to the transmission source of the command by the input device. FIG. 14 shows a data configuration example of [opcode] and [operand] of an input select control response serving as the response. This data is disposed in a packet shown in FIG. 7. In the area of the [opcode], data of [INPUT SELECT] which is a pertinent command are disposed. In the area of [operand (0)], data of the subfunction showing details of the control state is disposed. As for the data of the subfunction, data of the command is returned as it is. In the area of [operand (1)], a section of bits 1 to 4 (a portion denoted as "reserved") is here undefined, and status data (result status) which is data concerning the execution state of an order specified via the command by the input device is disposed in the section of bits 5 to 8.

In the area of the [operand (2)] and subsequent operands, data disposed in the control command are basically disposed and returned as they are. When the data is data which orders only the kind of the plug and which does not specify the plug, as the value of the input plug ID or the destination plug ID, however, the ID of the input plug (or the destination plug) assigned by the input device is disposed and returned.

The status data [result status] indicating the state of the input device disposed in the fifth to eighth bits of the section of the [operand (1)] is here defined, for example, as shown in FIG. 15. When this status data is used, there are [REJECTED] for rejecting the order of the command and [INTERIM] for returning an interim response, besides [ACCEPTED] for abiding by the order of the command, as response types. For each of response types, a plurality of status data values are set.

FIG. 15 will be described in order from the top. In the case of the response of [ACCEPTED] for abiding by the order of the command, the following two data are prepared.

1. [no error] data data indicating that the order of the command has succeeded

2. [ready] data data indicating that connection has completed in such a state that stream data can be inputted within the input device, but a wait state is caused due to some cause In the case of the response [REJECTED] for rejecting the order of the command, the following eight data are prepared.

1. [disabled] data data indicating that there is set such a mode as to inhibit input setting in response to an order from another device 2. [locked] data data indicating that the operation of the input device is locked due to some cause (such as in the middle of sound recording) and input setting cannot be conducted 3. [p-to-p]data data indicating that there is no room in the input plug and a connection cannot be established because there is a connection established under the control from another device 4. [insufficient resource] data data indicating that a connection cannot be established because there is no room in the band (channel) on the bus 5. [source not found] data data indicating that a specified output plug of the output device (source device) cannot be found 6. [not selected] data data indicating that a specified path cannot be established. This data is used when a path change is specified and the change to the path cannot be conducted.

7. [not registered] data data indicating that a specified path is registered. This data is also used when a path change is specified and there is not the specified plug.

8. [any other reason] data data at the time when the order is rejected for another reason.

Furthermore, in the case of the response of [INTERIM] which is an interim response to the command, the following two data are prepared.

1. [no information] data data transmitted temporarily when a response cannot be given within a time (for example, 100 ms) prescribed by the AV/C command transaction set because of some reason.

2. [busy] data data transmitted temporarily when a response cannot be given within a time (for example, 100 ms) prescribed by the AV/C command transaction set because of some reason. When this data is received, it can be judged that the normal state is restored after elapse of a predetermined time (for example, 10 seconds).

FIG. 16 shows a data example of an input plug ID disposed in the case of a control response. For example, 31 plugs for serial bus of [0] to [30] and 31 external output plugs of [0] to [30] are provided with individual IDs. Furthermore, IDs which can be defined in the future are prepared. Here, data of the maximum value FF is not used in the case of the response [ACCEPTED] for abiding by the order of the command.

Figure 17:
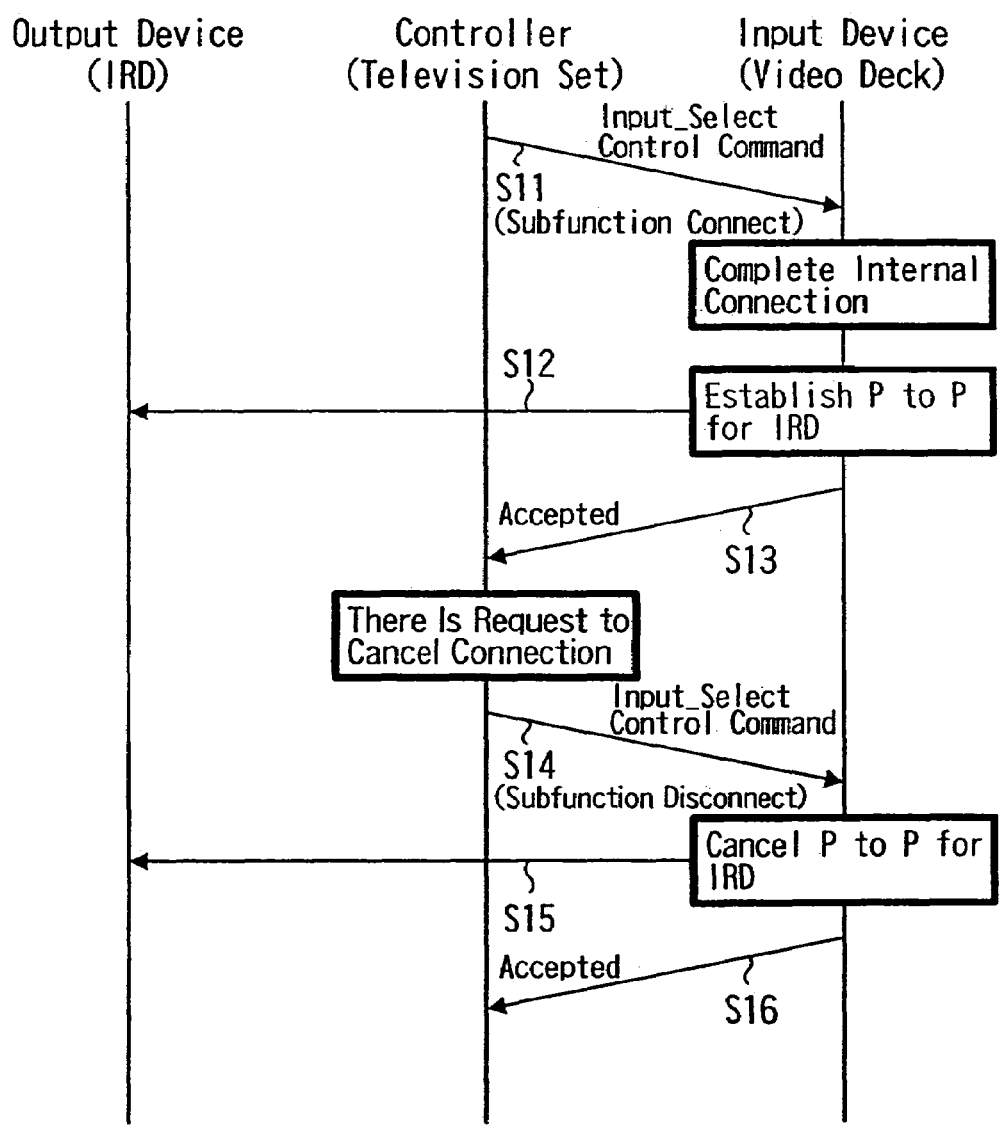
FIG. 17 is a diagram showing an example of processing according to an embodiment of the present invention.
Figure 18:
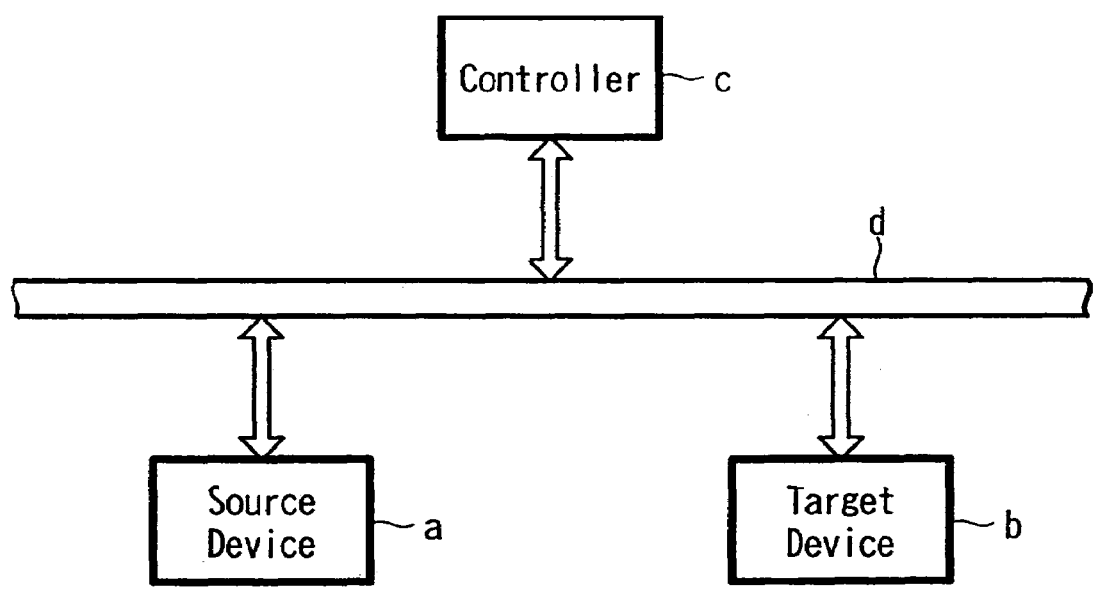
FIG. 18 is a configuration diagram showing an example of a network system.

An example of transmission processing using the input select command having the configuration heretofore described will now be described by referring to FIG. 17.

In this example, the IRD 1 is used as the output device (source device) of stream data. Video data and audio data received by the IRD 1 are sent out onto the bus 9. Furthermore, as the input device (target device), the video deck 2 for recording the video data and audio data transmitted from the IRD 1 is used. Here, the order of the transmission is issued by the television set 3 which is a control device on the bus.

It is now assumed that the control for making the video deck 2 record broadcast data (video data and audio data) of a specific channel received by the IRD 1 is conducted by the television set 3 on the basis of manipulation or the like within the television set 3. At this time, the control device (television set 3) sends the input select control command to the input device (the video deck 2) (step S11), and sends an order for requesting the connection management so that data outputted from the output device (IRD 1) may be received by the input device. In this control command, the subfunction becomes [Connect] for giving an order to establish the connection (see FIG. 10).

At this time, the video deck 2 which is the input device completes internal connection processing of connecting a tape subunit which is an internal function block to an input plug. In addition, the video deck 2 conducts processing of making the IRD 1 which is an output device establish a point to point (P to P) connection for connecting both devices and securing a transmission line on the bus (step S12). When this connection is established, the video deck 2 returns a response of [ACCEPTED] indicating comprehension of the order of the control command to the television set 3 which is the transmission source of the input select control command (step S13).

When the processing heretofore described is conducted, for example, the IRD 1 causes video data and audio data to be sent out on the secured transmission line on the bus. The video deck 2 receives the data and supplies the received data to the tape subunit in the video deck 2, and conducts processing of recording the data on a recording medium (videotape).

It is now assumed that a request to cancel the connection between the IRD 1 and the video deck 2 has occurred in the television set 3 serving as the control device because of some reason. At this time, the television set 3 sends the input select control command for canceling the pertinent connection to the video deck 2 (step S14). In this control command, the subfunction becomes [disconnect] for ordering disconnection of the connection (see FIG. 10).

When the video deck 2 has received the control command having the [disconnect] as its subfunction, a CPU in the video deck 2 executes processing of canceling the P to P connection between the video deck 2 and the IRD 1 (step S15). After the cancel processing has been executed, the video deck 2 returns a response of [ACCEPTED] indicating that the connection is canceled to the television set 3 serving as the control device (step S16).

In this way, the pertinent connection is canceled by sending a command for canceling the connection executed on the basis of a command sent by the control device to the input device on the bus. In the case where the input device manages the P to P connection, therefore, it becomes possible to cancel the connection from a device other than the input device. It becomes possible to conduct various controls, such as a change of the output device, efficiently on the basis of an order of a device having a control function, such as the television set.

In this case, only the control device which issued a request to establish connection is adapted to be able to issue an order to cancel the connection. Therefore, a different device on the bus does not cancel the connection. Accordingly, the transmission line setting state on the bus does not become confused.

In the example, heretofore described, the connection setting and canceling are executed according to an order from a control device (the television set 3) which is different from the output device (IRD 1). Alternatively, it is also possible that, for example, the output device incorporates the control function and the connection setting and canceling are executed according to an order from the output device.

In the above described embodiment, the processing in the case where video data and audio data are transmitted on the bus has been described. The embodiment can be applied to control used when various other stream data are transmitted on the bus. Furthermore, the output device and the input device may be devices other than those of the above described example.

Furthermore, in the above described embodiment, the case of the network including the bus of the IEEE 1394 scheme has been described. However, the embodiment can be applied to the case where similar data transmission is conducted between devices of a different network configuration.

Furthermore, in the above described embodiment, the function of conducting the above described processing is set in each device. Alternatively, it is also possible that a program for executing similar processing is distributed to users by using some provision medium and a user mounts a program stored in the medium on a computer device or the like connected to a bus (such as a bus of the IEEE 1394 scheme) to execute the similar function. The provision medium in this case may be a medium provided to users via communication means such as Internet, besides a physical recording medium such as an optical disk or a magnetic disk.

According to the present invention, it becomes possible to cancel input setting when a cancel order is received from the device which sent an order to execute the input setting, after an input device executed the input setting. Even if such a configuration that only the input device cancels data transmission setting is adopted, therefore, it becomes possible to cancel the setting for data transmission by only sending a cancel order to the input device, so long as the order is issued by a device which caused the setting to be executed. Efficient utilization of transmission bands on the bus thus becomes possible.

In this case, the input setting order is made an order to specify an input plug of the input device. Therefore, input setting processing with an input plug in the input device specified and its cancel processing become possible. It becomes possible in such a state that an input plug is specified to certainly conduct the input setting and its canceling.

Furthermore, the specified input plug specifies only a kind of the plug. Data specifying the plug subjected to input setting is obtained on the basis of a response from the input device. And the canceling order is made an order for canceling input setting of a plug specified by the data. Even if the state of the input plug of the input device is not known, therefore, it becomes possible for the device which orders the input device to conduct input setting, to send an order to execute the input setting. Furthermore, when canceling the input setting, a specific plug is specified. Therefore, it becomes possible to certainly cancel only the setting connected by a necessary plug.

Furthermore, a plug of an internal function block of the input device is also specified. As for the plug of the internal function block of the input device, therefore, specified input setting processing and its cancel processing become possible.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication method for an input device to receive streaming data output from an output device that is connected to a network, the method comprising:

performing input setting by the input device when an order for setting transmitted from the output device or another device is received at the input device, the input setting including an order to specify an input plug of the input device and a plug of an internal function block of the input device, wherein the input setting is performed based on said order for setting so that the data output from the output device is input to a data input section of the input device; and canceling said input setting by the input device when said output device or another device that transmitted the order for setting transmits an order to cancel the input setting.

2. The communication method according to claim 1, wherein said specified input plug specifies the type of the input plug.

3. The communication method according to claim 1, wherein data specifying the input plug subjected to input setting is obtained on the basis of a response from the input device.

4. The communication method according to claim 3, wherein canceling said input setting includes an order for canceling input setting of a plug specified by the data.

5. A communication apparatus comprising:

an output device coupled to a network;

an input device to receive streaming data output from the output device; and a controller configured to manage the input device performing input setting when an order for setting transmitted from the output device or another device is received at the input device, the input setting including an order to specify an input plug of the input device and a plug of an internal function block of the input device, wherein the input setting is performed based on said order for setting so that the data output from the output device is input to a data input section of the input device, and said controller configured to manage the input device canceling said input setting when said output device or another device that transmitted the order for setting transmits an order to cancel the input setting.

* * * * *